United States Patent [19]
Schwab et al.

[11] 3,873,748
[45] Mar. 25, 1975

[54] PROCESS FOR MAKING HIGH-PROTEIN CEREAL

[75] Inventors: Edward C. Schwab, New Brighton; Warren D. Petersen; Eric Bumbiers, both of Minneapolis, all of Minn.

[73] Assignee: General Mills, Inc., Minneapolis, Minn.

[22] Filed: July 2, 1973

[21] Appl. No.: 375,420

[52] U.S. Cl. ............................... 426/346, 426/446
[51] Int. Cl. ........................... A23l 1/10, A21d 2/00
[58] Field of Search .......... 426/351, 346, 141, 142, 426/212, 445, 446, 447, 448, 449

[56] References Cited
UNITED STATES PATENTS

| | | | |
|---|---|---|---|
| 3,318,705 | 5/1967 | Clausi et al. | 426/446 |
| 3,506,454 | 4/1970 | Reesman | 426/446 X |

*Primary Examiner*—Raymond N. Jones
*Attorney, Agent, or Firm*—Anthony A. Juettner; Elizabeth Tweedy; Norman P. Friederichs

[57] ABSTRACT

A process for making a high-protein ready-to-eat cereal which includes rehydrating a mixture of dried cereal dough and sodium caseinate, mechanically working the mixture to obtain semi-platicity, drying the mass and puffing by means of a fluid bed.

5 Claims, No Drawings

PROCESS FOR MAKING HIGH-PROTEIN CEREAL

The invention relates to a process for making high-protein ready-to-eat breakfast cereals. More particularly, this invention relates to a process for making high-protein ready-to-eat puffed breakfast cereals having unique textural properties.

Ready-to-eat breakfast cereals in either flake form or gun-puffed form are well-known commodities. Ready-to-eat breakfast cereals containing soy protein or hydrolyzed soy protein have been manufactured. In flake form, the presently available high-protein ready-to-eat breakfast cereals become soggy very quickly in milk. Presently available gun-puffed high protein ready-to-eat breakfast cereals suffer from off flavors due to the effect of high heat upon the protein.

High-protein ready-to-eat breakfast cereals made by the process of the present invention provide textural and/or flavor advantages over high-protein ready-to-eat cereals known in the art. They contain predominantly sodium caseinate as the protein component. The protein is subjected only to relatively low temperatures. The pieces have a uniformly bubbled structure of fine, thin-celled walls surrounding small voids. The texture of the pieces is exceptionally tender. The pieces are relatively stable in liquids, such as water or milk, and resist becoming soggy substantially longer than flaked ready-to-eat cereals. The flavor is superior to high protein ready-to-eat cereals wherein the protein has been subjected to high heat such as in gun puffing and/or in cooking or working the dough.

In the present invention a certain cereal base and certain dry protein base are reconstituted together to a relatively low and critical moisture content and then severely mechanically worked at low temperatures to develop semi-plasticity and homogeneity prior to extruding for purposes of air flow fluid bed puffing and toasting.

More particularly, in the process of the present invention, a cooked, dried and ground dough of cereal flour, selected from corn flour, rice flour and mixtures thereof, is mixed with dry sodium caseinate and the mixture added to water in amounts sufficient to bring the over-all moisture content to about 26 to 29 percent by weight of the mixture. The dry dough and the sodium caseinate compete for and tenaceiously hold the water. The mixture is very stiff. Severe mechanical work in the form of kneading and pulling is applied to the mixture under conditions which hold the temperature of the mass below about 145°F. until a stiff, viscous, sticky, opaque, homogeneous, semi-plastic mass is obtained. Working the dough into a state of opaque, homogeneous semi-plasticity prior to extrusion is essential to realizing the benefits of the invention. The worked dough is then extruded at temperatures below about 165°F. and the resulting rope is cut into pellets. The material after extrusion is translucent and semi-plastic. The change from opaqueness to translucency of the dough indicates that some type of change in the dough occurred during extrusion. Following the extrusion step, the pellets are cooled and preferably sheeted. The sheeted material is slit and cut into pieces which are dried and subsequently puffed and toasted in an air flow fluid bed oven.

In the above process, it is found that to obtain the unique puffed texture which characterizes the ready-to-eat breakfast food produced by the process of this invention, the cereal dough should contain corn flour or rice flour or mixtures thereof. It is also found that after reconstitution of the mixture of dry dough and dry sodium caseinate, the moisture level of about 26 to 29 percent, and preferably 26 to 27 percent, by weight of the reconstituted mass was essential in obtaining the benefits of this invention. Moisture levels below about 26 percent by weight of the mixture produce bubbling in the final product. Moisture levels below about 25 percent by weight of the mixture produce a final product which is gummy and rubbery. At moisture levels above about 29 percent, handling of the mix is difficult. In addition, it was found that from among the many known protein sources, sodium caseinate was vastly superior in producing good flavor and puffed characteristics in a fluid bed puffed ready-to-eat breakfast cereal. Other proteins such as soy protein can be used to some extend in conjunction with the sodium caseinate. Soy protein, however, does not provide the degreee of puffing obtained from sodium caseinate.

Finally it was found that the mixture of dry cereal dough, sodium caseinate and water should be worked into a homogeneous semi-plastic mass prior to extrusion and preliminary to fluid bed drying. By "semi-plastic mass" is meant a mass capable of being molded or receiving form when a pressure greater than 200 psig is applied. Severe working of the dough at this point develops sufficient plasticity in the dough that a high degree of puffing and smoothing of the pieces is obtained in the fluid bed. Working the dough to a state of plasticity prior to extrusion requires severe working conditions and a considerable power input. The form of work is kneading and pulling the dough. Best results were obtained by working the dough with counter rotating, rigid fingers. After working, the dough is characteristically opaque, homogeneous and semi-plastic. When in the process the cereal flour component, sodium caseinate and water mixture is not worked into a semi-plastic condition prior to extrusion only limited puffing can be obtained. The final product under these conditions lacks the degree of puffing, crispness and tenderness of the products made by the process of this invention.

In the preferred embodiment of this invention, the cereal component may contain, in addition to corn and/or rice flour, regular crystalline sugar for sweetness, brown sugar for flavor, salt, malt or corn syrup and a small amount of oil. It can also contain natural or artificial flavors and small amounts of vitamins. A small amount of wheat or corn starch can be added as a puffing aid. These additive type ingredients may make up as much as about 40 percent by weight of the cereal component. The moisture level of the initial cereal component is preferably about 7 to 10 percent by weight.

The cereal component can be cooked by conventional methods. Preferably the cereal component is mixed in a chamber equipped with an agitator and provided with a steam atmosphere. Once the cereal flour and the additive constituents have been admixed, sufficient water is added to permit gelatinization. The moisture content at this point is preferably about 15 to 25 percent, and most preferably about 17.5 to 18.5 percent, by weight of the mixture. The mixture is then cooked at a temperature sufficient to gelatinize the starch, preferably about 140° to 210°F. Thereupon the mixture is extruded and thereby puffed. The die temperatures are preferably in the range of about 275° to 330°F. Puffing at this point in the process is for the purpose of reducing the cost of subsequent drying. If the cost is not a consideration, puffing is optional. After extruding and puffing, the rope is cut into pellets which are dried in a forced air belt drier, i.e., a Proctor Schwartz Drier, to a moisture level of about 1 to 10 percent, preferably 6.5 to 8.5 percent, by weight of the cereal component. The pellets are then ground into finely ground particles.

The finely ground particles of dried dough are dry blended with sufficient sodium caseinate to yield a mixture of about 6 to 40 percent total protein by weight in the final product and preferably about 23 to 28 percent by weight of the final product. By "total protein" is meant the protein contributed by the cereal component and the protein contributed by the sodium caseinate. Water is added to bring the moisture content to about 26 to 29 percent by weight of the mixture. The mixture is then mechanically worked to form a semi-plastic, opaque mass. The temperature at the initiation of the mechanical working is ambient temperature. As working is applied to the mass, heat is generated. Cooling means are used to maintain the temperature of the mass below about 145°F. Once the semi-plastic, opaque mass has been formed, it is extruded at temperatures less than 165°F. Due to the stiffness of the mass, extrusion pressures of between about 600 to 3,000 psig are required. The rope formed is subsequently cut into pellets and cooled to a temperature below about 95°F. If the thickness of the pellets is about 0.032 to 0.044 inch thick, the pellets are ready for drying. If necessary, the extruded pellet can be reformed by passing the mass through shread rolls and sheeting to a thickness preferably of about 0.032 to 0.044 inch and most preferably about 0.034 to 0.037 inch. The sheet can then be slit into strips and cut into predetermined lengths to form pellets. One of the shred rolls should be smooth, the other corrugated or grooved. The roll pressure is preferably between about 1,000 to 1,500 psig. Best results have been obtained by sheeting the pellets. After shredding, slitting and cutting, the dough pieces can be subjected to a quick blast of cold air. The pellets are then dried by conventional means preferably in a rotary drier in two stages. The first stage in a rotary drier preferably involves drying at a temperature of about 140° to 150°F. for a period of about 10 to 30 minutes. The second stage preferably involves drying for a period of about 1 to 4 hours at a temperature of about 135°F. to 190°F. or until a moisture level between about 7.5 to 12 percent by weight and preferably about 8.5 to 11 percent by weight. Over 12 percent by weight moisture causes excessive bubbling. After drying the pellets are glassy hard. These pellets are then introduced into an air flow fluid bed oven in which the pellets are both puffed and toasted by conventional techniques. Preferably the puffing and toasting are conducted in two stages. in the first stage the pellets are subjected to temperatures of about 400° to 470°F. In the second stage, the pellets are subjected to a temperature of about 320° to 3502°F. The residence time required for puffing and toasting is in the order of about one to two minutes.

The product has a uniform bubbled interior structure. There are substantially no off flavors due to protein heating. Furthermore, the final product is substantially resistant to liquids and does not become soggy.

Set out below is a specific example of the practice of this invention. This example is illustrative and does not limit the scope of said invention.

EXAMPLE

The dry ingredients in the initial cereal component were screened to remove large pieces and foreign material from the mix. The dry ingredients were then fed to a Sprout Waldron Cooker and mixed. The fluid ingredients were then added and mixed with the dry ingredients. The complete cereal base had the following formulation:

| Ingredient | Percent (As To Basis) |
| --- | --- |
| Corn Meal Degermed Yellow Corn | 51.336 |
| Rice Flour | 18.000 |
| Sucrose | 15.000 |
| Wheat Starch | 4.000 |
| Sugar - Brown | 4.000 |
| Salt - Cereal | 3.250 |
| Malt Syrup | 2.000 |
| Coconut Oil 92° | 2.000 |
| Vitamins | 0.414 |
| | 100.000 |

The cereal base was mixed in the Sprout Waldron Cooker. Water was added at the exit end of the agitator section and at the entrance to the extrusion auger. The agitator temperature was 210°F. at a feed rate of about 8 lbs./min. The cereal base was moved by the auger through a die. The die temperature was about 310° to 350°F. The cereal base was extruded through 9/32 inch holes. Two ropes were extruded. The ropes fell onto a feed belt which transfers them to a temper belt. The temper belt carried the ropes to a cutter where they were cut into pieces approximately ¾ inch in length. The pieces were conveyed to a Proctor Schwartz drier. At temperatures of approximately 190°F. and belt speeds of 15 feet per minute on the heating sections, the pieces were dried down to about 6.5 to 8.5 percent moisture based on the weight of the mixture. The dried pieces were then ground in a hammer mill and ground through a 1/32 inch round-holed screen. The ground cereal base was then mixed with sodium caseinate. The proportions were about 23.1 percent sodium caseinate by weight based on the weight of the mixture and about 76.9 percent ground, dried dough by weight based on the weight of the mixture.

The cereal base-sodium caseinate mixture was conveyed into a high powered kneader mixer with counter rotating, rigid fingers and a power rate usage of 15 to 20 kilowatts per hour. After a period of dry working 1.9 lbs. of water were added per 7.1 lbs. dry mix to bring the moisture level of the mixture to about 26.5 percent. The mixer jacket was cooled with water to maintain the temperature of the mixture below about 145°F. The moistened mixture was then worked until a homogeneous semi-plastic, opaque dough was obtained. Once the above dough condition was obtained the dough was extruded through a breaker plate having 3/32 inch holes and then through a die having 3/16 inch holes. The temperature of the die head was about 175°F. Actual dough temperature at extrusion was about 167°F. The extrusion pressure was 650 to 850 psig. The extruder operated at 14.5 rpm. The extruded rope was cut into pellets about 3/16 inch long.

The pellets were cooled to about 95°F. in an air enrober and then moved to a surge belt. The surge belt provided a constanat feed rate to an agitator hopper. The agitator hopper fed the dough pellets onto shred rolls, one of which was corrugated. The shred rolls were cooled with cold water. The shred roll pressure was 1,000 psig. The shred rolls were set at 40 ft. per minute. The sheet was slit into 7/16 inch wide strips which were subsequently cut into 5/8 inch flat rectangular pellets with corrugations on one side. The pellets were cooled with an air blast in an enrober. The pellets were then dried in a Helix drier in two stages. The first stage was at a temperature of about 140°F. for a period of 30 minutes. The second stage was at a temperature of about 134°F. for a period of 180 minutes. During the drying the pellets were case hardened. The pellets were then conveyed to a fluid bed where they were puffed in two stages. The first stage was at a temperature of about 450°F. for a period of 54.5 seconds. The second stage was at a temperature of about 330°F. for a period of 28 seconds. The volume of the final product was 5 ounces/128 cubic inches. The final moisture was 2.0%.

The final product was crisp and retained its crispness in milk. There were no off flavors. The bubbled interior structure was uniform.

I claim:

1. A process for making a fluid bed puffed ready-to-eat cereal comprising:

combining a cooked, dried and ground dough consisting essentially of a cereal mixture including about 60 to 100 percent cereal selected from corn flour, rice flour and mixtures thereof with a protein consisting essentially of dry sodium caseinate in an amount whereby the total protein content is about 6 percent to 40 percent by weight in the final product, combining water with the dried mixture in an amount to bring the moisture level to about 26 to 29 percent by weight of the total mixture, kneading and pulling the resulting mixture into a semi-plastic, opaque, homogeneous mass, while maintaining the said mass at a temperature below about 145°F., extruding the resulting semi-plastic, opaque, homogeneous mass, said mass being maintained at a temperature below about 165°F. during extrusion, drying the mass to a moisture content of about 7.5 to 12 percent by weight, and puffing the dried mass by means of an air flow fluid bed.

2. The process of claim 1 wherein the protein is in an amount of about 23 to 28 percent by weight of the final product.

3. The process of claim 1 wherein the amount of water combined with the mixture of dried cereal dough and sodium caseinate brings the moisture level of the total mixture to about 26 to 27 percent.

4. The process of claim 1 wherein the extruded mass is sheeted to a thickness of about 0.032 to 0.044 inches prior to drying.

5. The process of claim 1 wherein the extruded mass is sheeted to a thickness about 0.034 to 0.037 inches prior to drying.

* * * * *

PO-1050
(5/69)

UNITED STATES PATENT OFFICE
CERTIFICATE OF CORRECTION

Patent No. __3,873,748__   Dated __March 25, 1975__

Inventor(s) __Edward C. Schwab, Warren D. Petersen and Eric Bumbiers__

It is certified that error appears in the above-identified patent and that said Letters Patent are hereby corrected as shown below:

Title page, under Abstract, line 4, delete "semi-platicity" and insert -- semi-plasticity --.

Column 2, line 18, delete "extend" and insert -- extent --.

Column 3, line 59, "in" should be capitalized.

Column 3, line 62, delete "3502°" and insert -- 350° --.

Column 5, line 3, delete "constanat" and insert -- constant --.

Signed and sealed this 17th day of June 1975.

(SEAL)
Attest:

RUTH C. MASON
Attesting Officer

C. MARSHALL DANN
Commissioner of Patents
and Trademarks